United States Patent Office 3,630,931
Patented Dec. 28, 1971

3,630,931
COMPOSITIONS FOR CLEANING STONE, BRICKS AND CONCRETE
Georges Salomone, Paris, France, assignor to Societe Anonyme SEFA, Paris, France
No Drawing. Continuation-in-part of application Ser. No. 543,024, Apr. 18, 1966, now Patent No. 3,481,879, dated Dec. 2, 1969. This application Sept. 15, 1969, Ser. No. 869,990
The portion of the term of the patent subsequent to Dec. 2, 1986, has been disclaimed
Int. Cl. C11d 7/08, 7/10, 7/26
U.S. Cl. 252—142      2 Claims

ABSTRACT OF THE DISCLOSURE

A product for cleaning stone, bricks, concrete and other constructional material consists essentially of an aqueous paste having as a base ammonium bifluoride, barium chloride, hydrofluoric acid and ammonium sulfate with a stabilizing sugar.

---

This application is a continuation-in-part of my copending patent application filed Apr. 18, 1966, Ser. No. 543,024, now Patent No. 3,481,879.

Said co-pending application has for its objects a novel product for cleaning stone, bricks, concrete and other constructional material, said product being a paste adapted to be applied immediately by means of a brush on the surface to be cleaned, which surface is then scrubbed and finally rinsed with water.

The product of my former application is constituted by an aqueous paste having as a base ammonium bifluoride, barium chloride, magnesium fluosilicate, zinc fluosilicate, hydrofluoric acid and sodium fluosilicate with a stabilizing sugar.

Now I have discovered that the fluosilicates may advantageously be replaced by ammonium sulfate.

Accordingly my improved product is constituted by an aqueous paste having as a base ammonium bifluoride, barium chloride, ammonium sulfate and hydrofluoric acid with a stabilizing sugar.

The aqueous paste consists essentially of:

| | Parts by wt. |
|---|---|
| Ammonium bifluoride | 6–15 |
| Barium chloride | 10–20 |
| Ammonium sulfate | 6–15 |
| Hydrofluoric acid | 4–8 |
| Pulverulent sugar | 12–30 |
| Water | 30–60 |

By way of a prefered example, providing optimum results, the following composition may be proposed for the paste.

Water—250 litres
Ammonium bifluoride—50 kg.
Barium chloride—82 kg.
Ammonium sulfate—50 kg.
Hydrofluoric acid—32 kg.
Pulverulent sugar—100 kg.

The mixture is prepared in a container which cannot be attacked by said components such as a vat of polyvinyl chloride. In said vat are poured 100 litres of water, the barium chloride is added with stirring and the stirring is continued until the mixture gets thick. The ammonium sulfate is then added with stirring and, the mixture thickening, water is progressively added. Lastly the ammonium bifluoride and pulverulent sugar are also added with stirring with addition of water. Finally the hydrofluoric acid and the remaining water are added to the paste.

The paste obtained is applied for use by means of a brush over the surface to be cleaned after which said surface is cleaned with a brush having yielding brass bristles and is finally rinsed with water.

What I claim is:

1. A product for cleaning constructional material such as stone, bricks and concrete, constituted by a pasty mixture consisting essentially of the following materials in their respective proportions:

| | Parts by wt. |
|---|---|
| Ammonium bifluoride | 6–15 |
| Barium chloride | 10–20 |
| Ammonium sulfate | 6–15 |
| Hydrofluoric acid | 4–8 |
| Pulverulent sugar | 12–30 |
| Water | 30–60 |

2. A product as claimed in claim 1 wherein the proportions are as follows:

Water—250 litres
Ammonium bifluoride—50 kg.
Barium chloride—82 kg.
Ammonium sulfate—50 kg.
Hydrofluoric acid—32 kg.
Pulverulent sugar—100 kg.

References Cited

UNITED STATES PATENTS

| 3,481,879 | 12/1969 | Salomone | 252—136 |
| 3,150,007 | 9/1964 | Kovachy | 252—145 X |
| 2,118,386 | 5/1938 | Swinehart | 252—145 X |
| 1,885,390 | 11/1932 | Textor | 252—142 |
| 1,471,466 | 10/1923 | Hageman | 252—142 X |
| 208,441 | 9/1978 | Varns | 252—142 X |

OTHER REFERENCES

"The Chemistry of Cement and Concrete" by F. M. Leg. and C. H. Desch, 2d. ed. 1956, page 589.

LEON D. ROSDOL, Primary Examiner
D. L. ALBRECHT, Assistant Examiner

U.S. Cl. X.R.

134—3; 252—79.3, 79.4, 152